June 5, 1951    L. F. KNIGHT ET AL    2,555,695
METHOD AND APPARATUS FOR FORMING CRANKSHAFTS
Filed May 13, 1949    4 Sheets-Sheet 1
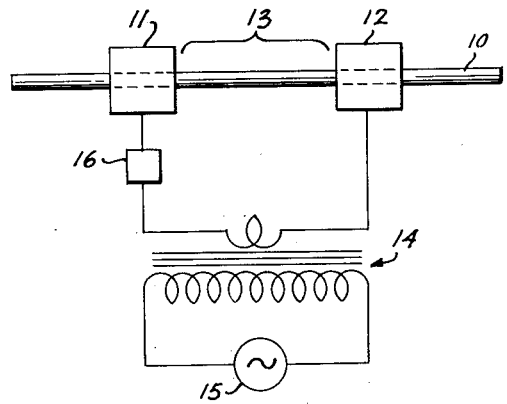
Fig. 1
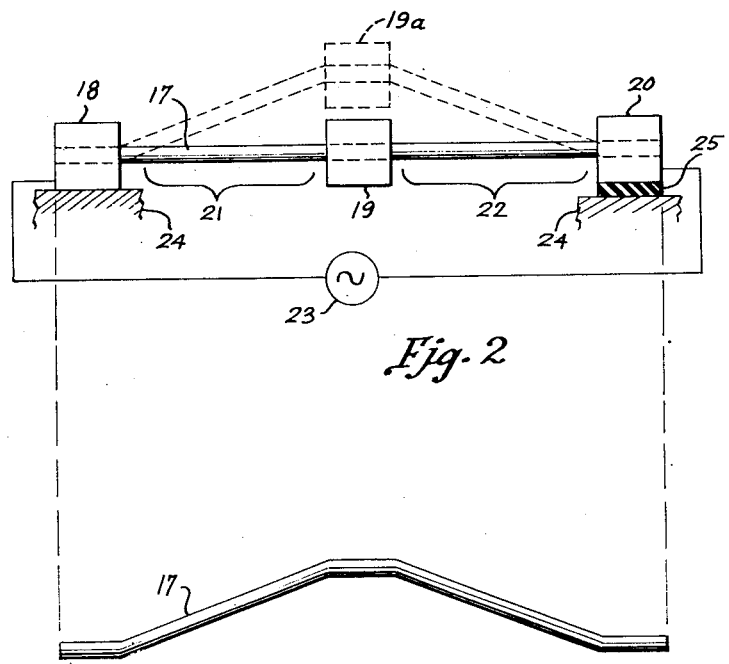
Fig. 2
Fig. 3
Inventors
LORNE F. KNIGHT
ARNOLD PITT
By: Fetherstonhaugh & Co.
Att'ys

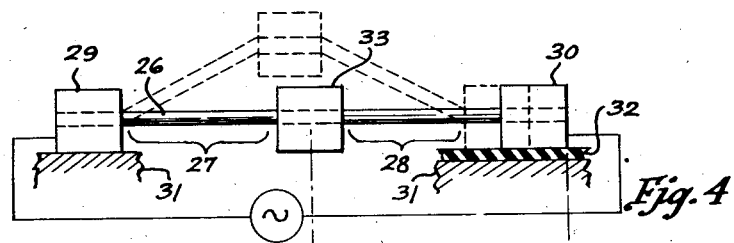
Fig. 4
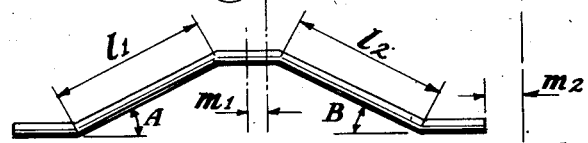
Fig. 5
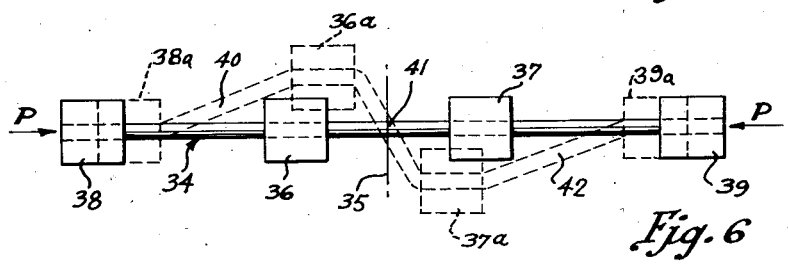
Fig. 6
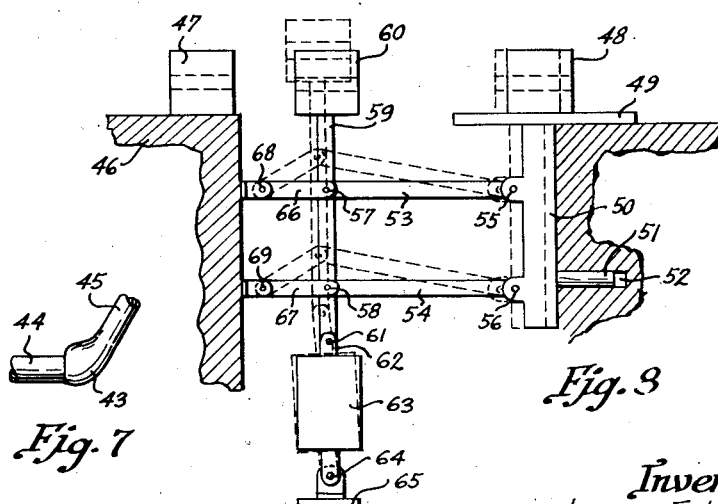
Fig. 7
Fig. 3
Inventors
LORNE F. KNIGHT
ARNOLD PITT
By: Fetherstonhaugh & Co.
Att'ys Inventors
LORNE F. KNIGHT
ARNOLD PITT
By: Fetherstonhaugh & Co.
Att'ys Patented June 5, 1951

2,555,695

UNITED STATES PATENT OFFICE 2,555,695

METHOD AND APPARATUS FOR FORMING CRANKSHAFTS

Lorne F. Knight, Toronto, Ontario, and Arnold Pitt, Weston, Ontario, Canada, assignors to Massey-Harris Co. Ltd., Toronto, Ontario, Canada Application May 13, 1949, Serial No. 92,982

14 Claims. (Cl. 219—3)

This invention relates to a method and apparatus for forming engine crank shafts or the like.

In conventional working of ferrous metal bar stock or rod to deform a portion of it by bending it is either necessary to heat the complete stock and to clamp the same at either end of the region to be bent or to clamp the stock and heat it in the region to be bent. In the first case the clamping of the stock causes a deformation in the region of the clamping means. In the second case, the heating of the region to be bent diminishes toward the clamps resulting in a degree of curvature in the bend which cannot be constant throughout the arc of the bend.

It is the particular object of the present invention to provide a method of deforming bar stock wherein the clamped regions of the bar stock are not deformed by the gripping action of the clamps.

With this and other objects in view, the invention generally relates to a method of forming a crank shaft or the like from straight ferrous metal rod or bar stock comprising finishing surfaces of the rod or stock to form bearing surfaces or the like, clamping said stock on either end of a deformable region thereof and preferably about the finished surfaces, causing an electric current to pass through said region from one clamp to the other of a magnitude causing the deformable region to heat to deforming temperature, due to electrical resistance thereof and moving one clamp relative to the other.

Other objects of the invention will be appreciated from a study of the following specification taken in conjunction with the accompanying drawings.

In the drawings:

Figure 1 is a schematic diagram of bar stock having a deformable region clamped at both ends thereof by clamps which are included within an electrical circuit.

Figure 2 is a schematic illustration of the invention as applied to the deformation of bar stock in two regions.

Figure 3 is a view of a bar stock after deformation according to the method of Figure 2.

Figure 4 illustrates a modification of the previous methods in that one of the clamps is anchored and the others are allowed to move in such manner that bar stock material is not stretched but only bent.

Figure 5 is a view of the completed bar stock fashioned according to the method of Figure 4.

Figure 6 illustrates a further modified method for forming a structure such as a crank shaft wherein both ends of the crank shaft during deformation move toward the central region under pressure of axial forces. Figure 7 shows a portion of deformed bar stock illustrating the characteristics of a knee of a bend when formed in accordance with the method of Figures 4 or 6.

Figure 8 is a diagrammatic view of apparatus operative according to the method of Figure 4.

Figure 9:
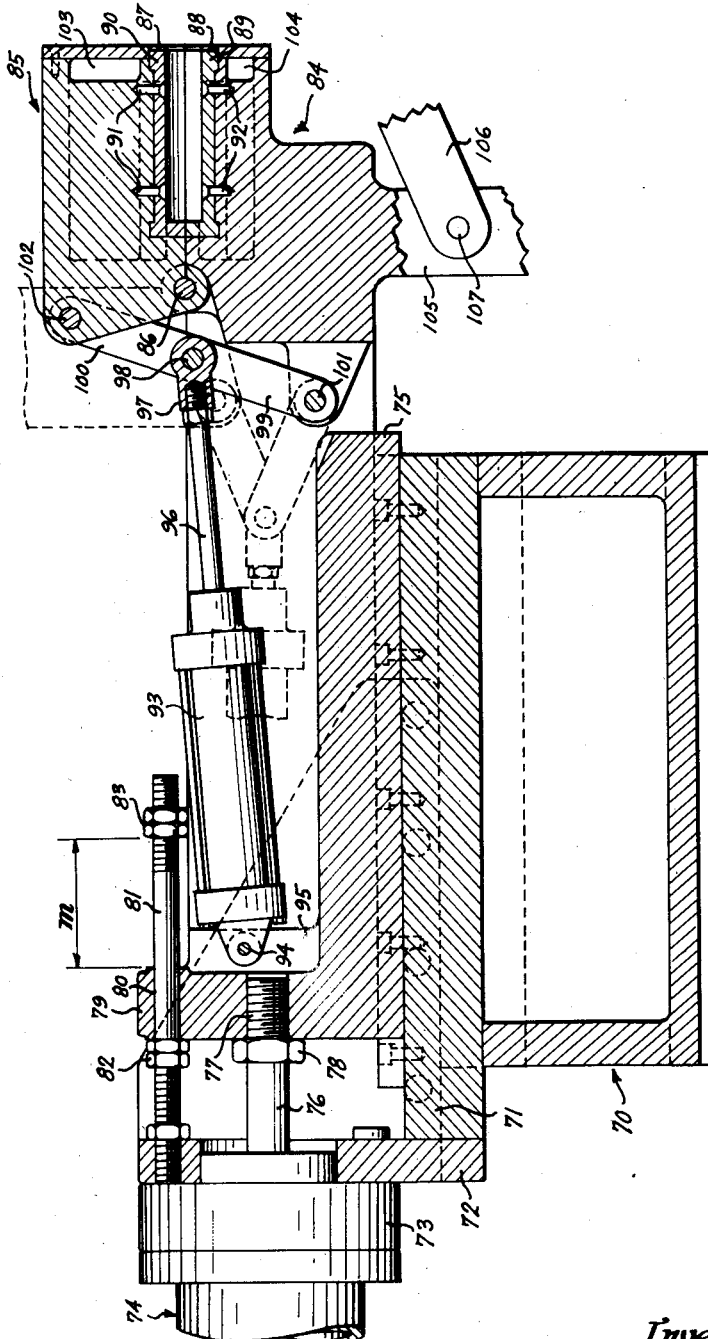
Figure 9 is a sectional view of end clamping and axial force applying apparatus operative according to the method of Figure 6.

Referring now specifically to the drawings in Figure 1 the method according to the invention is illustrated. A rod 10 or bar stock, of a type which is capable of being deformed more readily due to heating, is clamped by suitable clamps 11 and 12 on both ends of the deformable region 13. The clamps 11 and 12 are of an electrical conducting material and make electrical connection to the stock 10, these clamps serving as electrodes and being connected to a source of electrical current such as transformer 14 connected to source 15.

According to the invention the current passing through the deformable region 13 between electrodes 11 and 12 causes heating in the region 13 due to the electrical resistance of the latter. Since the clamping members 11 and 12 are formed of an electrical conducting material the electrical resistance of the rod 10 is effectively in parallel with the electrical resistance of each clamp. The resistance is, therefore, very low in the clamping regions and negligible heating occurs except in the deformable region.

Accordingly, as soon as the region 13 has been heated sufficiently the clamping members 11 and 12 may be moved one relative to the other to cause deformation in the region 13 either in the form of a simple bend or in stretching or compressing the region. Before the deforming operation and after a pre-determined degree of heating has been attained the electrical circuit through the electrodes 11 and 12 is broken by means of a suitable electric switch 16.

After deformation and cooling of the bar stock, only the deformable region 13 will have undergone any deformation since the regions of the stock held by the clamps 11 and 12 will not have been subjected to undue heating. Therefore, in accordance with the invention the bar stock may be machined or have its surfaces otherwise finished before the bending or deforming operation is carried out.

In Figure 2 a bar stock 17 is shown clamped at three points by clamps 18, 19 and 20, determining deformable regions 21 and 22 thereof. In this case the clamp 19 need not serve as an electrode. However, this may be done where a higher degree of heating is required say in the region 21 than in the region 22 and accordingly a higher current concentration would be required in the region 21. It may also be desirable to have the clamp 19 serve also as an electrode as well as clamps 18 and 20 if the deformable regions 21 and 22 are of substantially different length of sectional area and where substantially the same degree of heating is required in both regions. In any case, according to the figure a source of electrical power 23 connects to the clamps 18 and 20 wherein the latter if desired may be anchored to a suitable machine bed 24. It will be realized, however, that in such instance one of the electrodes must be insulated from the other such as the electrode 20 which rests upon suitable insulation 25 separating the same from the bed 24.

As electrical current passes through the stock 17 the clamp 19 will be effectively electrically in parallel with that region of a bar stock to which it is fixed and accordingly the degree of heating in the region of the clamp itself is negligible. However, the regions 21 and 22 will be heated to a temperature at which they may be deformed. According to the invention the clamping means 19 are then caused to move to a position indicated in chain lines by numeral 19a. The bar stock 17, therefore, takes the form illustrated in Figure 3, wherein the portions clamped by the clamps 18 and 20 remain in their original axial alignment being undisturbed as to shape. The portion clamped by the clamp 19 is now displaced from the axial line of the axially aligned or end clamped portions of the deformed stock, in parallel spaced apart relation thereto. The regions 21 and 22 are the only portions of the bar which are deformed and are stretched during the deforming process.

A further alternative method, according to the invention is illustrated by Figures 4 and 5. In this case the bar stock 26 having deformable regions 27 and 28 is clamped at either end by electrode-type clamps 29 and 30 wherein either of these clamps such as the electrode clamp 29 is anchored to a suitable machine bed 31.

The other clamp 30 is insulated by the insulating member 32 from the bed 31 and is slidable along the bed during deformation of the bar stock. A third clamp 33 of a type having two directions of movement is similar in other respects to the clamp 19 of Figure 2. The clamp 33 during the deforming operation moves outwardly of the axial line of the stock 26 and toward the anchored clamp 29. The clamp 30 also moves toward clamp 29 along the axial line of the bar stock.

Referring to Figure 5 which is diagrammatic of the final forged bar stock, it will be apparent that the movement of the clamp 33 toward the clamp 29 is a distance $m1$. Also the movement of clamp 30 is its own movement due to angle $Bm2$ as well as $m1$. These movements are additive and are employed for control purposes as hereinafter disclosed in detail.

Where it is desired to form multiple displaced portions of a final shaft, such as on a conventional engine crank shaft serving a multiple piston arrangement, it is desirable to move all of the clamps toward an intermediate point to limit the amount of axial movement of the clamps, and thereby economize in the general machine structure carrying out the necessary operations. Also, it is possible to work to smaller tolerances in the deforming operation.

Thus, in Figure 6 the bar stock 34 is deformed axially in a direction toward the transverse medial line 35. In accordance with this method of operation, the clamps 36 and 37 have two directions of movement similar to clamp 33, Figure 4, and finally arrive at the positions indicated at 36a and 37a respectively. The end clamps 38 and 39 are moved axially toward the middle line 35 to the positions 38a and 39a. In this connection it is preferred that rather than having the clamps 38 and 39 drawn inwardly, the clamps be positively urged inwardly by application of forces P. It will be noted that the deformable regions 40, 41 and 42 of the bar stock 34 in this case will be deformed only at those regions adjacent the clamps. It has been found that by application of the axial forces P in the manner indicated, the bending operation occurs without resulting in any appreciable stretching of the outer surfaces of the bar. As a result, the final bend form at the region of the bend will appear only slightly enlarged as indicated by numeral 43 in Figure 7. The portion 44 which has been retained in the clamp, retains its machine surface. The remainder of the deformable portion indicated by numeral 45 is substantially unaffected. The bend therefore is substantially local and does not disturb the structure of the material worked adversely in any respect so far as can be determined from tests already made. Furthermore, it would appear that the slight enlargement in the region of the bend itself is beneficial both in guarding against deleterious effects to the structure, during working and cooling and in providing against excessive strains which normally occur at such a region during the normal use under operating conditions as a crank shaft or the like.

Having illustrated the general method and modifications thereof according to the invention, it is now pertinent to illustrate specific features of apparatus capable of deforming bar stock in accordance with the invention.

Thus in Figure 8 a diagrammatic view of apparatus is given which will be sufficiently descriptive to skilled persons to enable a practical machine to be made in accordance with the principles outlined. The components disclosed are intended for operation according to the method described previously with reference to Figure 4. Thus, the machine may have a bed 46 carrying a fixed end clamp 47 rigidly attached thereto and which is insulated therefrom. The bed 46 also carries a co-operating end clamp 48 which is fixed to a plate 49 but electrically insulated therefrom. Plate 49 is slidably mounted on the bed 46 for slidable movement in the axial direction of bar stock extending between the clamps 47 and 48. A suitable member 50 depends from the plate 49 and may carry a guide bar 51 which is slidably received in a bore 52 in the bed 46. Member 50 pivotly mounts the arms 53 and 54 as at 55 and 56. The other ends of these arms pivotly connect as at 57 and 58 with the mounting bar 59 of the intermediate clamp 60. The lower end of the intermediate clamp pivotly connects as at 61 to the plunger 62 of a suitable actuating device as a hydraulic ram 63 pivotly connected as at 64 to suitable anchorage 65. Links 66 and 67 extend between connections 57 and 58 and the bed 46 to pivotly connect thereto as at 68 and 69.

In operation the apparatus ensures that the axial line of the clamp 60 is not moved out of parallel relation with the axial line of the clamps 47 and 48 as it is moved outwardly. That is to say, a parallel relation is ensured and further, by the means described such as the links and arms illustrated, the bar stock may be bent without stretching as described with reference to Figure 4. In this connection, the clamp 48 follows the clamp 60 in movement in the axial direction, the total movement thereof being equal to $m1$, plus $m2$ as described previously with reference to Figure 5.

Although the apparatus of Figure 8 will work quite satisfactorily, it is unduly clumsy for operations embodying any production application such as might be required for the formation of a crank shaft as illustrated in Figure 6. The important details, however, involve the actual mounting of the clamping devices.

Thus, in Figure 9 an end clamping device is shown in section which is mounted on a block structure 70 forming a part of the bed of the machine (not shown). The block structure 70 supports the female guides 71 of a dovetail slide, and project to mount a mounting plate 72 which supports the end portion 73 of a hydraulic ram 74. A slidable block 75, slidable in guide 71 by means of well known dovetail slide construction, is fastened to the actuating rod 76 of the ram 74, the fastening being adjustable by the thread 77 and lock-nut 78. The back wall 79 of the slidable block 75 is bored as at 80 for free passage of a limit rod 81 which extends from the mounting plate 72 as indicated. The limit rod 81 carries suitable stopping means such as the nuts 82 and 83 which define the limits of slidable movement of the slidable block 75 and determining limits of movement $m$ as discussed previously with reference to Figure 5.

Clamping head 84 integrally extends from the slidable block 75 and has a swingable clamping head 85. The latter is pivotly mounted as at 86 and is swingable to open the jaws 87 and 88 for insertion of the end of a piece of bar stock. Suitable liners 89 and 90 define the engaging surfaces of the jaws and preferably are in the form of half shells of bronze-like commutator material. The liners are fastened into the jaws by suitable screws 91 and 92 as indicated.

Figure 10:
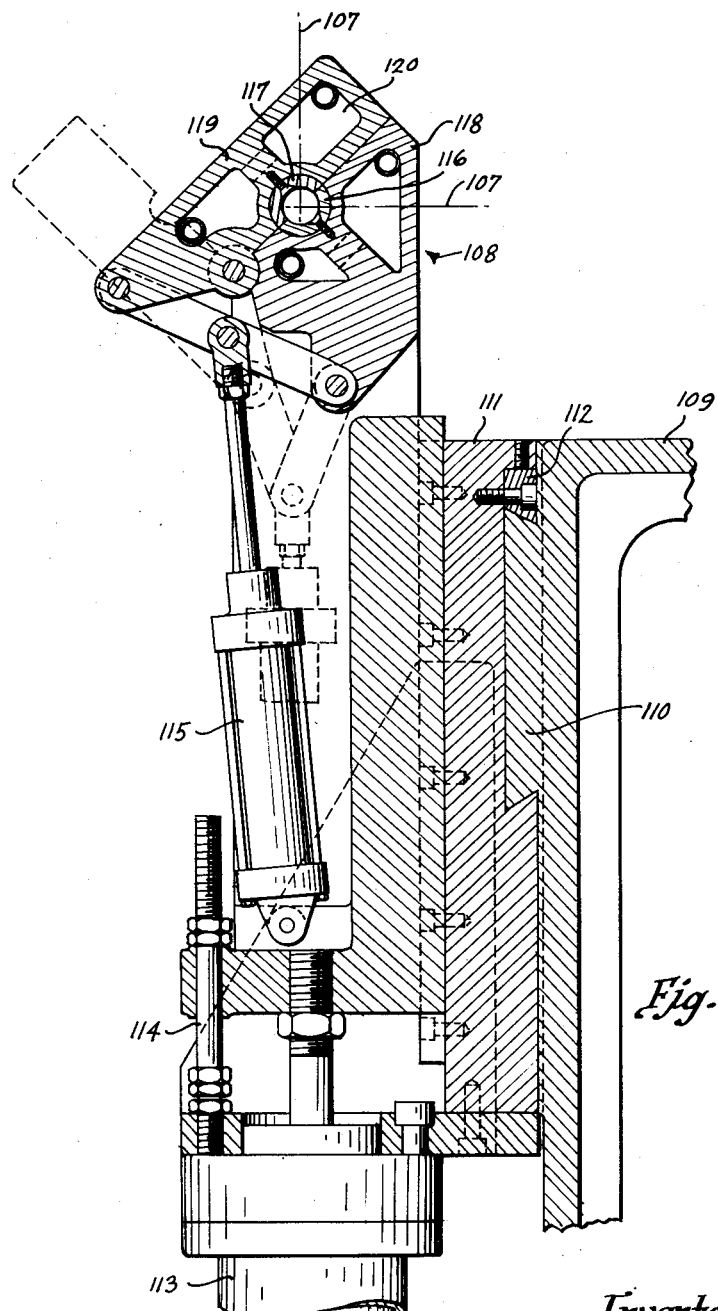
Figure 10 is a sectional view of clamping apparatus having two directions of movement according to the method of Figures 4 and 6.

Preferably the jaws of the end clamping head are opened by a pneumatic device such as pneumatic cylinder 93 which is pivoted as at 94 to a projection 95 extending from the end wall 79 of the slidable block 75. The plunger rod 96 of the pneumatic cylinder extends to a fitting 97 pivotly connected as at 98 to a pair of arms 99 and 100 which extend to connect to the clamping head 84 and swingable clamping head 85 as at 101 and 102 respectively. Each of the jaws is surrounded by cooling passages 103 and 104 as indicated, which may be served by a steady circulatory flow of water. If the end clamping device is intended for use in apparatus of the general character disclosed in Figure 8, then a projection 105 may extend from the clamping head 84 to mount suitable links such as the link 106 pivoted as at 107. It may or may not be necessary to provide some sort of guide device such as the guide bar 51 of the apparatus of Figure 8, depending upon the rigidity of structure desired. A clamping device having two directions of movement is shown in Figure 10 being of a type which may be employed after the manner of use of clamps 33, 36 and 60 in Figures 4, 6 and 8. The view is along the axis of the bar stock being worked upon, the axis of the bar being indicated by lines 107. In this illustration, the clamping device 108 has a direction of movement vertically as well as axially of the bar stock. Thus the bed 109 of the machine carries a horizontally disposed doved-tailed slide component 10 upon which is mounted the carriage 111, including the dovetailed gib 112, for slidable relation in a horizontal manner and parallel to the axis of the bar stock. The carriage 111 corresponds to the block structure 70 of Figure 9, the ram 113, limit device 114 and pneumatic cylinder 115 being components corresponding to like components in the latter figure. A point of difference, however, resides in the clamping head 108 in that the sleeve components 116 and 117 in the stationary head 118 and clamping head 119 allow through passage of the bar stock. It should be noted however, that these sleeve components are of material such as electrobronze so that good electrical contact is made by their inner surfaces to the clamping surface of the bar stock in the clamped region.

The clamping device 108 must be insulated electrically from the other clamping devices of the machine and this may be done in any conventional way, such as by insulating the components in the carriage from electrical connection to the clamping head. Preferably, the clamping head includes the cooling passages 120 through which a suitable coolant may be circulated. It has not been found necessary to provide separate coolant sources for each of the clamping heads where a coolant such as water is employed since relatively low voltage but high current electrical power is employed. Links such as the link 106 of Figure 9 may extend for pivotal connection to the carriage 111 in a suitable manner in accordance with the principal outlined in the previous figures to ensure a predetermined amount of horizontal movement of the clamping head during deforming operations.

It will be appreciated that by means of the apparatus described, a length of bar stock may be clamped at both ends by end clamping devices of the type described with reference to Figure 9 and clamped in intermediate regions by clamping devices having two directions of movement as desired and of the type illustrated with reference to Figure 10. In operation, electrical current is fed to the end clamping device and the bar stock heated due to its resistance to current flow until a predetermined degree of heat is attained. Control of the heating may be determined by an examination of the bar stock by a suitable pyrometer. If desired a photoelectric device particularly sensitive to the infra-red regions of the spectrum may be employed to automatically throw a relay in accordance with well-known methods of operation in electrical devices whereby the electric circuit is opened when a predetermined temperature has been reached. It is preferred that the opening of the electric circuit be accomplished by actuation of suitable well-known devices such as electric solenoids or other suitable means controlling hydraulic valves whereby the hydraulic rams are brought into operation. The rams will actuate the various clamping heads to cause deformation of the bar stock in the desired regions. The limit stops such as the devices 81 and 114 of Figures 9 and 10 respectively will determine the stroke of the clamping heads. Also, if desired, limit switches of the electrical type may be employed in conjunction with the hydraulic ram devices to control the actuation of valves governing flow of hydraulic fluid into these rams. It will be obvious that there are various ways of accomplishing the objects desired, that is, of ensuring a predetermined amount of movement for each of the clamping heads whether they be of the axially moving type or of a type for movement in a direction transversely of the axis of the bar stock or having a direction of movement which is a resultant of two such movements.

It has been found that bar stock may be machined or otherwise finished and thereafter deformed to form an article such as a crank shaft. The finished surfaces in that region of the crank shaft which is designed to receive bearings such as connecting rod bearings and the like are undisturbed during the deforming operation. The finished surfaces are preserved in the clamped areas by reason of the large body of metal clamped about these regions which reduces the electrical resistance thereof to a negligible factor as compared with resistance of a true section of the bar stock being worked and, therefore, heating occurs to a marked degree only between the clamps. Although it is preferred that the clamping heads be cooled by a circulating coolant, this will not usually be necessary unless it is intended that operation be carried out in continuous production.

Many modifications and alterations with regard to the apparatus disclosed for operation according to the method of the invention will be apparent to skilled persons. It is, therefore, intended that the present disclosure should not be construed in any limiting sense other than that which may be interpreted from the scope of the following claims.

What we claim as our invention is:

1. A method of forming an engine crank shaft from a straight length of rod or bar stock comprising, finishing surfaces of the bar stock to provide bearing surfaces or the like, clamping the bar stock about at least a portion of certain of said finished surfaces to define clamped regions, passing an electrical current between two clamped regions to cause heating of the unclamped portions therebetween to a deforming temperature, moving a clamped region of the bar stock substantially at the ends of a heated region thereof to cause bending of the bar stock adjacent the clamped region, the movement being transverse of the axis of the bar stock when straight, and moving an intermediate region of the bar stock between the two clamped regions thereof in a transverse path different than the path of transverse movement of the clamped region adjacent the heated region.

2. The method of forming an engine crank shaft from a straight length of ferrous metal rod, bar stock, or the like comprising, clamping the bar stock at spaced apart regions along its length, causing an electrical current to flow through the bar stock from one endmost clamped region to the other endmost clamped region to provide heating of the bar stock to a deforming temperature between the clamped regions thereof, moving certain of the clamped regions in a direction transverse of the axis of bar stock and moving certain of the clamped regions of the bar stock simultaneously with the transverse movement thereof in the axial direction of the bar stock and toward a common point so that the heated regions of the bar stock do not become stretched during transverse movement of the clamped regions thereof.

3. The method according to claim 2 and the further step of applying axial compressive forces to the ends of the bar stock.

4. Apparatus for bending ferrous metal rod, bar stock, or the like comprising, a machine bed, at least a pair of clamps, means for mounting said clamps on said bed in normal axial alignment to receive a straight length of bar stock, the mounting means for one of said clamps including guide means allowing movement of said clamp in a direction transversely of the normal axial alignment thereof, electrical conductors forming a part of said clamping means and having surfaces for making electrical connections to surfaces of the bar stock clamped thereby, insulating means isolating said clamps electrically, means for causing an electrical current to flow between said clamps through bar stock held thereby, and means for moving said guided clamp in a direction determined by its guide means and transversely of the normal axial alignment of said clamps when the bar stock has been heated to a deforming temperature by passage of electrical current therethrough.

5. Apparatus for forming an engine crank shaft or the like from a straight length of rod or bar stock comprising, a machine body, a plurality of clamps slidably mounted on said body, means for providing slidable movement of certain of said clamps in the axial direction of bar stock held thereby, means for guiding the movement of certain other of said clamps in a direction transversely of the axial line of the bar stock, a hydraulic ram disposed between the machine body and each transversely movable clamp for causing transverse movement thereof, and means for supplying an electrical current to the clamps designed to engage the endmost regions of the bar stock to cause heating of the latter in the unclamped regions therebetween to a deforming temperature, and means for actuating said hydraulic ram when the bar stock has reached a deforming temperature.

6. Apparatus as claimed in claim 5 and axial guide means disposed between at least one transversely movable clamping head and said machine body to allow two directions of movement for said clamping head.

7. Apparatus as claimed in claim 5, and stop means determining the limits of transverse movement of said transversely movable clamps.

8. Apparatus as claimed in claim 5, and axial guide means disposed between at least one transversely movable clamping head and said machine body to allow two directions of movement for said clamping head, and link means operatively connecting between said clamp and said machine body.

9. Apparatus for forming an engine crank shaft from ferrous metal rod, bar stock, or the like comprising, a machine body, end clamping means for clamping the end regions of bar stock, means slidably mounting at least one of said end clamps to allow slidable movement thereof in the direction of the axis of bar stock clamped thereby, an auxiliary clamp designed to engage the bar stock in a region between said end clamps, means for mounting said auxiliary clamp to allow two directions of movement for the same and comprising guide means supported by said machine body and allowing one direction of movement for said auxiliary clamp, and further guide means supported by the latter guide means and allowing another direction of movement of said auxiliary clamp, one of said guide means being designed to allow movement of the auxiliary clamp in a direction parallel to the axis of the bar stock held by the end clamp, and the other being designed to allow movement of the auxiliary clamp in a direction transversely of said axis, means acting between the machine body and the auxiliary clamp for causing transverse movement of the same, and at least one link member operatively extending between said auxiliary clamp and said machine body to determine movement of the same in a direction parallel to the axis of said bar stock.

10. Apparatus as claimed in claim 9 and at least one link member operatively extending between said auxiliary clamp and the slidably mounted end clamp.

11. Apparatus as claimed in claim 9 and at least one link member operatively extending between said auxiliary clamp and the slidably mounted end clamp, and means for applying an auxiliary compressive force to said bar stock during deformation of the same as certain of said clamps are moved.

12. A method of forming an engine crank shaft from a straight length of rod or bar stock comprising, clamping the bar stock at certain portions to define clamped regions, passing an electrical current between any two clamped regions to cause the heating of the unclamped portions therebetween to a deforming temperature, moving a clamped region of the bar stock substantially at one end of the heated region thereof to cause bending of the bar stock within the heated region but toward the ends thereof, said movement being transverse of the axis of the bar stock when straight, and moving a portion of the bar stock between the said two clamped regions in a transverse path different than the path of transverse movement of the clamped region adjacent the heated region.

13. Apparatus for bending ferrous metal rod, bar stock, or the like, comprising; a machine bed, a pair of spaced apart clamps designed to grip a length of bar stock at spaced apart regions thereof, means for moving one of said clamps in a direction transverse of the axis of the bar stock clamped thereby and serving to mount said clamp on said bed, means for mounting the other of said clamps on said bed, electrical conductors forming a part of said clamping means and having surfaces for making electrical contact to surfaces of the bar stock clamped thereby, insulating means isolating said clamps electrically, means for causing an electrical current to flow between said clamps by a path through the bar stock held thereby, and at least one auxiliary clamp disposed between said clamps and connected electrically in parallel to a region of the bar stock to decrease the electrical resistance of the region and preserve the surface finish thereof during heating of the unclamped portions of the bar stock between said clamps.

14. Apparatus for forming an engine crank shaft or the like from a straight length of rod or bar stock, comprising; a machine bed, a plurality of clamps mounted on said bed, means for providing slidable movement of certain of said clamps in the axial direction of the bar stock held thereby, means for supplying an electrical current to the clamps engaging the endmost regions of the bar stock to cause heating of the bar stock in the unclamped regions therebetween to a deforming temperature, means acting between the machine bed and certain other of said clamps for causing movement thereof in a direction transverse of the axial line of the bar stock, and a link operatively connecting two of said clamps whereby the length of bar stock extending therebetween is controlled in predetermined manner during movement of one clamp relative to the other.

LORNE F. KNIGHT.
ARNOLD PITT.

REFERENCES CITED

The following references are of record in the file of this patent:

UNITED STATES PATENTS

| Number | Name | Date |
|---|---|---|
| 432,630 | Lemp | July 22, 1890 |
| 435,110 | Burton | Aug. 26, 1890 |
| 458,115 | Thomson | Aug. 18, 1891 |
| 1,259,275 | Murray | Mar. 12, 1918 |
| 1,295,048 | Macdonald | Feb. 18, 1919 |
| 1,752,598 | Jorgensen | Apr. 1, 1930 |
| 2,006,459 | Jones | July 2, 1935 |
| 2,219,279 | Caspar | Oct. 29, 1940 |
| 2,393,718 | Stenson et al. | Jan. 29, 1946 |
| 2,477,020 | Van Sant | July 26, 1949 |